United States Patent

Sanctuary

[15] 3,707,699
[45] Dec. 26, 1972

[54] REMOTE SCORING SYSTEM FOR BOMBING OR ROCKET RANGE

[72] Inventor: Clifford Sanctuary, Palos Verdes Estates, Calif.

[73] Assignee: Del Mar Engineering Laboratories, Los Angeles, Calif.

[22] Filed: Aug. 7, 1970

[21] Appl. No.: 62,065

[52] U.S. Cl. ............340/16 M, 273/102.2 S, 340/6 R
[51] Int. Cl..................................................G01s 5/18
[58] Field of Search...340/1 C, 5 R, 6 R, 16 R, 16 M; 273/102.2 R, 102.2 B, 102.2 S

[56] References Cited

UNITED STATES PATENTS

| | | | |
|---|---|---|---|
| 2,916,289 | 12/1959 | Zito | 340/16 M |
| 3,504,334 | 3/1970 | Turnage, Jr. | 340/16 R |
| 2,398,432 | 4/1946 | Livermore | 340/5 R |
| 3,445,808 | 5/1969 | Johnson | 340/16 R |

Primary Examiner—Richard A. Farley
Attorney—Jessup & Beecher

[57] ABSTRACT

An improved scoring system is provided for use in conjunction with land or water ordnance ranges for training military personnel. The system to be described utilizes two pairs of pressure transducers positioned at right angles to one another around the perimeter of the target area. The differential time of arrival of seismic pressure waves at the transducers is sensed and data is made available at a remote read-out station. The resulting data may be presented on two electrical displays connected to corresponding electronic counters. The resulting data may be plotted on a plotting board, for example, to provide polar coordinates representative of range and bearing from an aiming point. Alternately, the polar coordinates may be derived by means of an appropriate electronic digital computer.

5 Claims, 7 Drawing Figures

REMOTE SCORING SYSTEM FOR BOMBING OR ROCKET RANGE

BACKGROUND OF THE INVENTION

The scoring of inert bombs and rockets in most military training establishments is usually carried out, in accordance with prior art practice, by using optical spotting techniques. Binoculars mounted in a transit-like manner are directed at the dust or smoke puff which occurs upon impact of such bombs or rockets. In the prior art system, for example, two observers are usually stationed about 2,500 feet from the target area, and they direct their optical equipment at the resulting dust or smoke which occurs at impact, with the optical axes from the two stations intersecting at the point of impact with an angle of approximately 90°.

In the prior art system, for example, the two observers are located in individual towers, and they align their spotting binoculars with the dust in the case of rockets, or with the spotting smoke charge in the case of practice bombs, which occurs following the ordnance impact. Then, the resulting angular data is relayed from each of the spotting towers to a plotter, who in turn plots this data and derives the azimuth and miss-distance of the impact.

Scoring accuracy by the prior art optical method is complicated by the fact that dust clouds may obliterate the actual point of contact. Moreover, night training is not appropriate when the prior art optical method is used. Further inaccuracies are inherent in the prior art manual scoring method which are due, for example, to improper sighting by observers, wind conditions which move the dust or smoke, erroneous readings of the angular scale on the binocular mount, errors in the transmission of angular data to the plotter, errors in plotting angular data, errors in the transmission of scoring data to aircraft, human bias, and the like.

The system of the present invention provides a remote scoring system which is not susceptible to the problem of dust clouds, and which can be used to advantage in night training. Also, the system of the invention is extremely more accurate than the prior art optical method, and it effectively reduces the manpower requirements of the range.

The land range system to be described herein relies upon time of arrival of the seismic pressure waves at four separate seismic (geophone) sensors. The sensors are spaced at 90° angular positions around the perimeter of the target area. Arrival time differences of the seismic waves are measured from opposing sensors. Between any two opposite sensors, a time arrival difference of the seismic waves is measured from the impact point and a locus of points is determined which provides a "line-of-position". This line-of-position between the sensors describes a curve which has all the characteristics of a hyperbola.

The system of the present invention is appropriate for land or water ranges. As mentioned above, the system is predicated on seismic detection of the impacting of the bomb or projectile, or other ordnance, with the earth or water surface. As described, four sensors are located at equi-angular positions around the target perimeter, and these sensors produce respective output signals corresponding to the time of arrival at the various sensors of the seismic waves generated by the impact of the projectile. Usually the four sensors will be activated at different times, and the measurement of the relative sensor activation times fixes the point of impact of the projectile. The data gathered from the sensors may then be processed and transmitted to a range observation post.

Specifically, the four acoustic sensors deliver an output voltage pulse at the arrival time of the acoustic energy generated by the projectile impacting the land or water. The resulting voltage pulses are suitably filtered and transmitted to the control station or observation post where a numerical read-out of the hyperbolic coordinates of the projectile impact location is displayed. From these hyperbolic coordinates, the exact impact point is established, for example, on a graphic target plotting sheet. In this way scoring information may be made available for transmission to the operating aircraft personnel in a matter of seconds following the impact of the projectile.

The scoring system of the present invention, in addition to the features outlined above, is advantageous in that it is highly reliable, and easy to maintain and operate.

DETAILED DESCRIPTION OF THE ILLUSTRATED EMBODIMENT

The scoring system of the present invention monitors an ordnance target area by time differential measurements of the pressure waves created by impact of the ordnance within the target area. In general, soil of a land range has the property of transmitting impacting forces, in the form of seismic pressure waves, by way of molecular motion; and water of a water range has similar properties. In most instances, these seismic forces are radially divergent from the point of impact of the projectile. When two sensors (geophones) are set up to detect a discrete seismic wave, and when this wave is created at any point on a line equidistant from the two sensors, the sensors will receive the wave at the same time. However, if the wave is created at a point which is not equidistant from the two sensors, then there will be a differential between the time of arrival of the wave insofar as the two sensors are concerned. If lines of constant time differential are plotted, it may be seen that such lines form a hyperbolic pattern.

Figure 1:
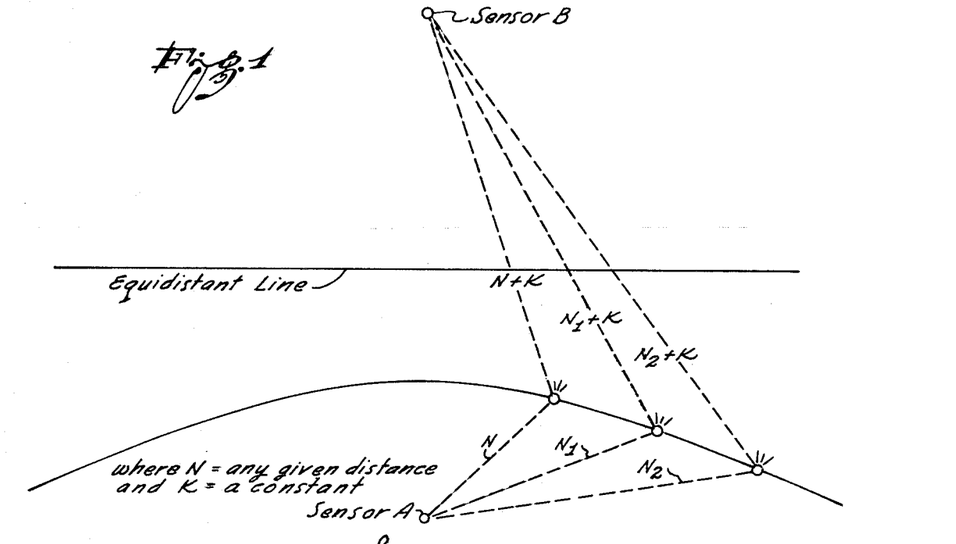
FIGS. 1, 2 and 2A are diagrams useful in explaining the underlying principles of the scoring system of the invention.
Figure 2:
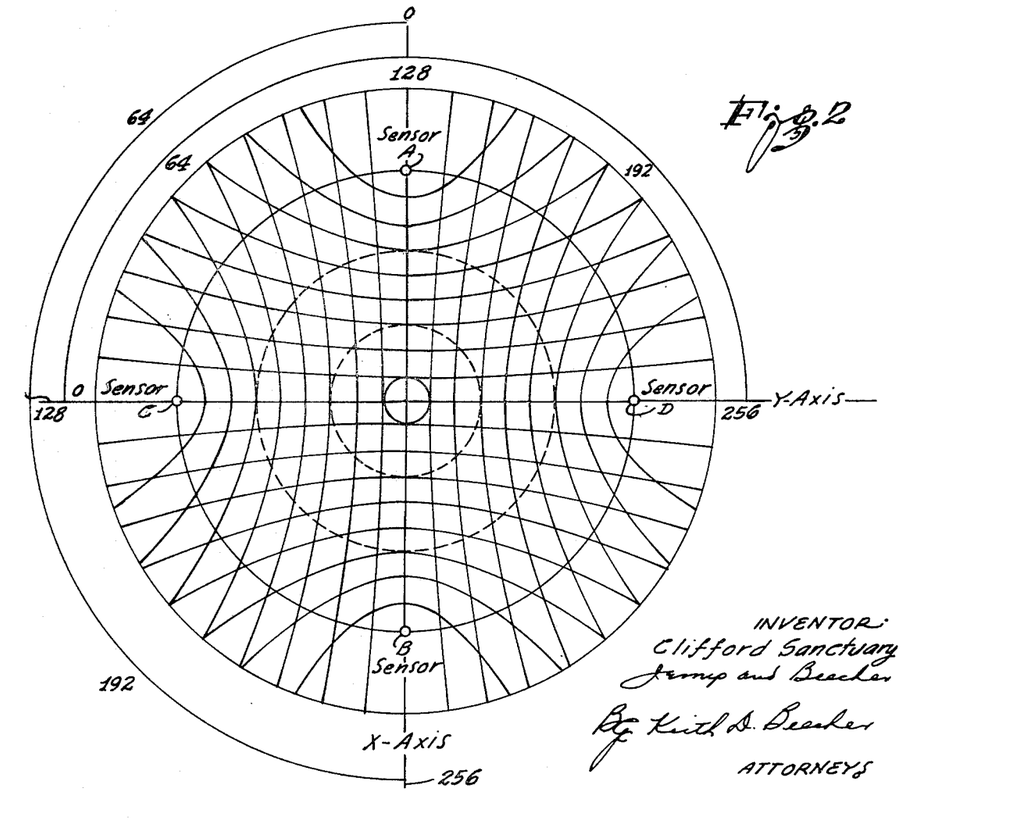
Figure 2A:
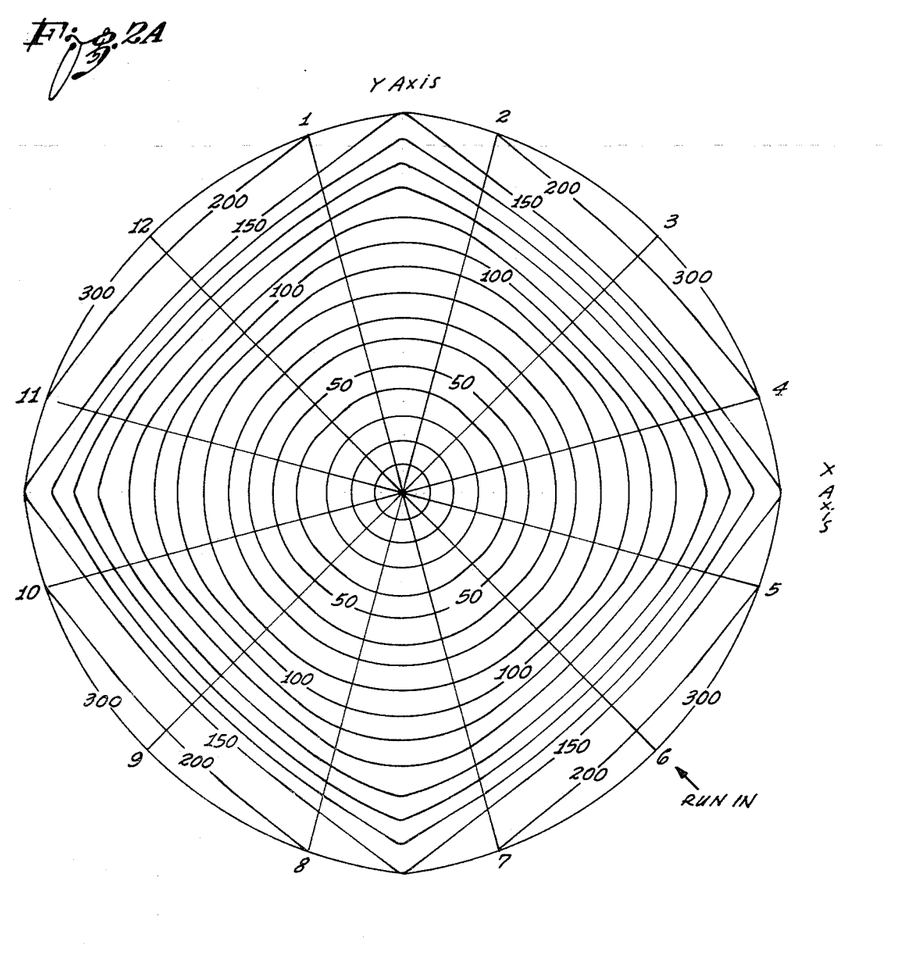

In mathematical terms, the two sensors, designated sensor A and sensor B in FIG. 1 are focal points for a family of hyperbolic lines corresponding to all possible time differentials. Such hyperbolic lines are shown, for example, in FIG. 2 with respect to the sensors A and B, and also with respect to sensors C and D. However, it is possible to distort the hyperbolas as shown in FIG. 2A, so that they are essentially linear and thus produce a rectilinear grid and simplify the plotting procedures. The bomb circle is distorted to match.

It will be observed that sensors A and B are diametrically opposite one another insofar as the impact area is concerned, the sensors being located on the perimeter of the impact area. Likewise, the sensors C and D are diametrically opposite to one another and, in the illustrated embodiment of FIG. 2, the axes of the sensors A, B and C, D are perpendicular to one another. For convenience, it will be assumed that the sensors C and D lie on the Y-axis, and the sensors A and B lie on the X-axis.

When the two pairs of sensors A, B and C, D are placed at ninety degrees to one another, two intersecting hyperbolic lines are determined and the origin of the detected seismic wave is fixed. The representation of FIG. 2 is a typical pattern of coverage for an impact area monitored in such a manner. A grid system is provided which is composed of equally spaced hyperbolas taken from the family of hyperbolas between each pair of sensors A, B and C, D. The accuracy with which a point may be located is determined by the area of the grid sections near that point. Again referring to FIG. 2, it will be seen that the area of greatest accuracy is near the center of the target.

It will be appreciated that, in the case of the land range, for example, a particular type of seismic sensor (geophone) is provided. That is, the geophones used in the system must be of the type which produce signals when excited in the horizontal plane. It is also important that the geophones exhibit minimum response to vertical plane excitations to minimize the effects of aircraft noise when aircraft fly over the target area. Such seismic sensors are installed in the target area as designated A, B, C and D in FIG. 3. These sensors are buried, for example, to a depth of 5 to 10 feet. The sensors are interconnected by appropriate cable 10 to the data conditioning and display unit. The latter unit is located, for example, in a range tower 12. In the representation of FIG. 4, for example, two separate target areas are provided, and the transducers associated with the second target area are designated respectively A', B', C' and D'. These latter transducers are also connected by a cable 10' to the associated data signal processing and display unit in the range control tower 12.

Specifically, in the case of the land range, earth movement resulting from an impact by the projectile is sensed by the buried sensors. These sensors are commercially known as "geophones", having been developed originally for oil field seismic surveys. Such a sensor is also used in conjunction with the measurement of earthquakes.

The seismic sensor essentially is a weight lightly suspended in a container, and the container is buried in the soil with a suitable force-measuring transducer positioned between the suspended weight and the side walls of the container. When the earth is caused to move impulsively, the container is shaken but the suspended weight remains motionless. The resulting relative movement between the container and the weight may be measured by a wide variety of different means. Commercial geophones have been used in a constructed embodiment of the invention, in which the aforesaid weight is part of a permanent magnet surrounded by a cylindrical electrical coil attached to the case. This provides an electrical output whenever relative motion occurs. The seismic sensor so used weighed about 13¼ ounces, and had a height of 1½ inches and a diameter of 2⅜ inches.

Figure 3:
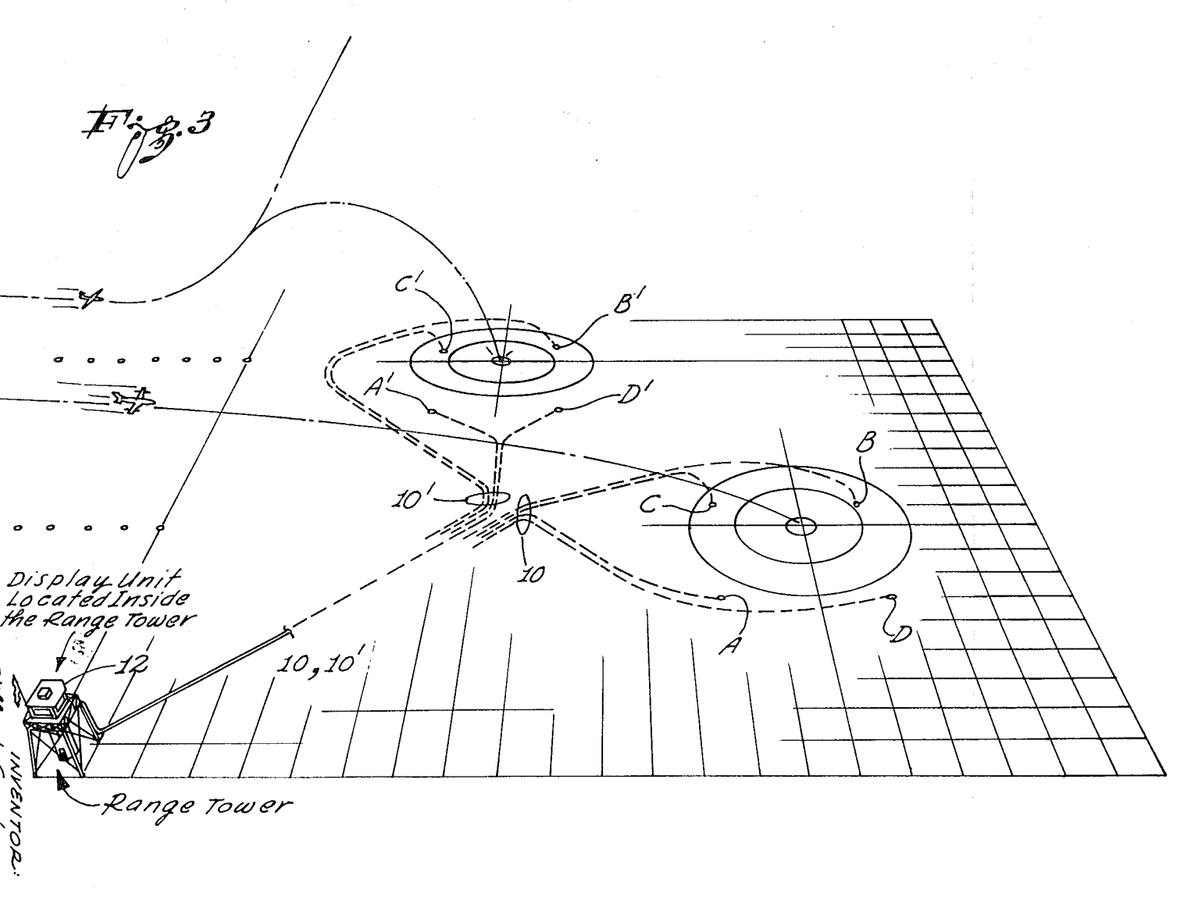
FIG. 3 is a perspective representation of a typical range installation which involves a scoring system incorporating the concepts of the present invention.
Figure 4:
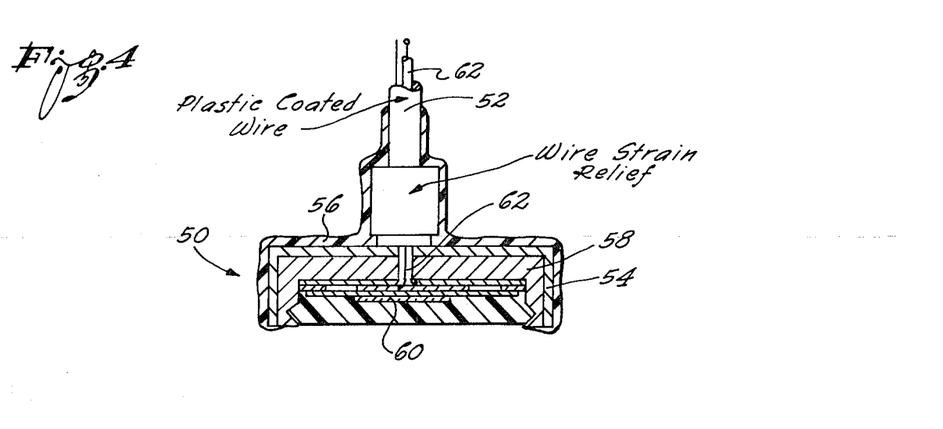
FIG. 4 is a representation of a suitable water pressure transducer suitable for use in one embodiment of the invention.

The device is buried in the soil, as shown in FIG. 3, on the outer perimeter of the largest bombing circle facing towards the center. Since the sensor comprises a moving coil over a magnet, a positive or negative electric impulse is generated dependent upon whether the compressive impulse comes from behind or in front. In the system of the invention, for example, only the positive side of the transducer is used. In order to survive the rugged requirements at the bombing circle and even to take direct hits, a low cost commercial geophone of the permanent magnet type was selected for the particular constructed embodiment of the invention.

Since the sensor itself is a commercial item, and individually forms no part of the present invention, it is believed that a more detailed description of the sensor is unnecessary herein. It might be pointed out, however, that when the system of the invention is utilized in a water-type range, a different type of acoustic detection device is used. For example, a suitable sensor 50 for the water range is shown in FIG. 4, although many suitable commercial hydrophones are presently available which are appropriate for the purpose.

The underwater transducer or sensor 50 of FIG. 4 is suspended under the water, for example, by means of a plastic coated cable 52. The transducer is supported within a housing 54 formed, for example, of brass or other appropriate material. The housing may be sealed, for example, in an appropriate plastic coating 56. The transducer itself may be supported in a lead block 58 within the housing 54. The transducer comprises a crystal 60 which is connected to wires 62. The wires extend to the electrical processing equipment inside the cable 52. The crystal responds to water pressure wave stresses to create corresponding electric signals. The crystal may be sealed within the lead block by means, for example, of a plastic seal 61.

The transducers of the type shown in FIG. 4 have been satisfactorily tested. The units are omnidirectional, and changes can be made to provide a degree of directivity to the pattern so as to increase the sensitivity over the impact area if required. The particular sensors constructed for a constructed embodiment of the invention have a natural frequency of approximately 10 KHz, which means that the leading edge of a shock wave in the water can be measured to an accuracy of at least 10 microseconds. The sensors are connected by the wires 62 in the cable 52 to a data conditioning and display unit, similar to the unit described above in conjunction with FIG. 3.

Figure 5:
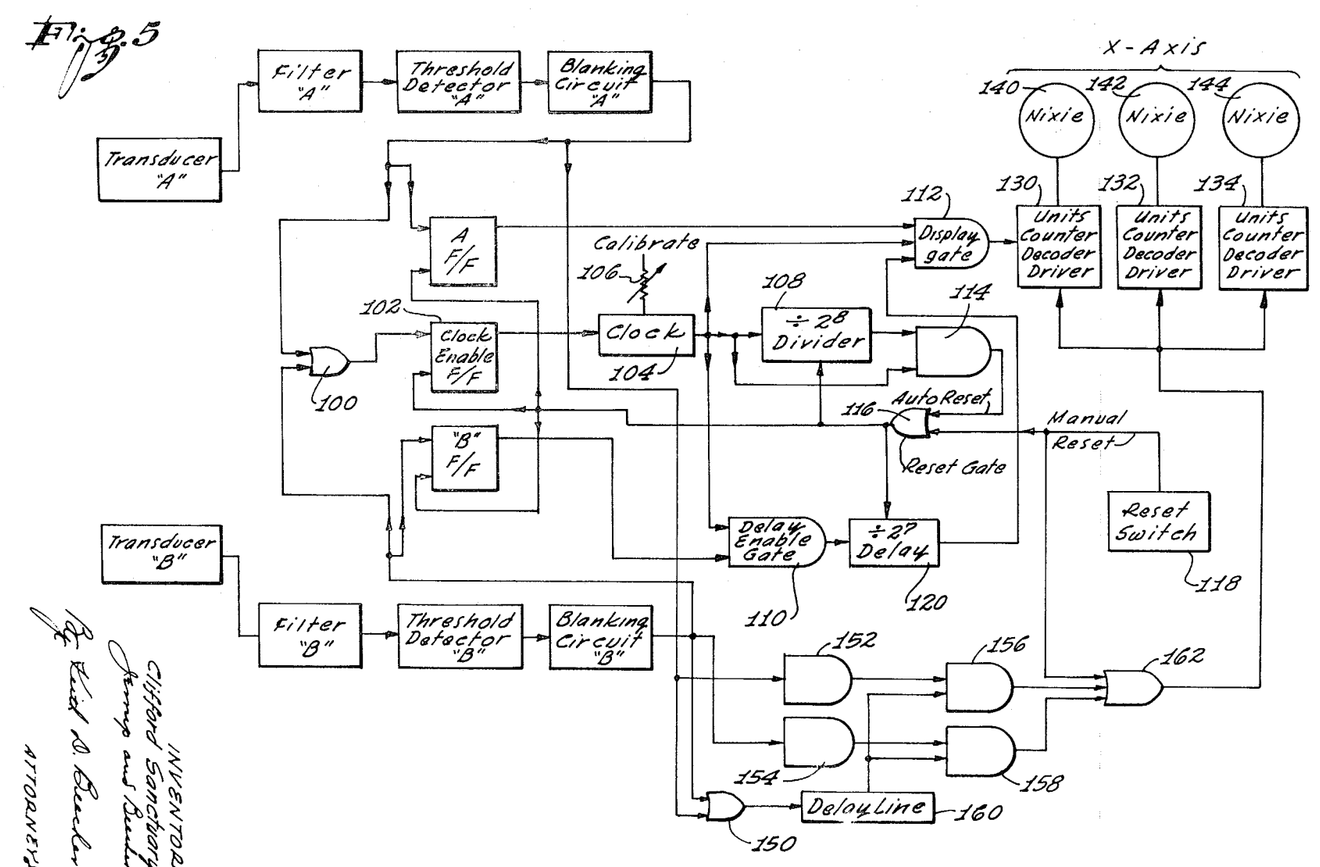
FIG. 5 is a logic diagram of an electronic conditioning and display unit for utilizing the electric signals developed in the system of the invention, and representing, for example, the X-axis display, a similar logic system being used for the Y-axis data.

A simplified logic diagram for use in the data conditioning and display unit is shown in FIG. 5. As mentioned above, the system of FIG. 5 is intended to control the X-axis display, and is connected to the transducers A and B. It will be appreciated that a similar logic system is connected to the transducers C and D to provide the Y-axis display.

The signals from the transducers A and B are applied to respective filters designated "A" and "B" in FIG. 5. The filters in turn are connected to respective threshold detectors "A" and "B", which are connected through blanking circuits "A" and "B" to an appropriate "or" gate 100 which, in turn, is connected to a clock enable flip-flop 102. The output of the clock enable flip-flop is connected to a clock generating circuit 104 which may be calibrated, for example, by a potentiometer 106. The clock pulses from the generating circuit 104 are applied to a ($2^{-8}$) frequency divider 108, to a delay enable "and" gate 110 and to a display "and" gate 112.

The blanking circuits are also respectively connected to an "A" flip-flop and to a "B" flip-flop. The "A" flip-flop is connected to the display gate 112, and the "B" flip-flop is connected to the delay enable gate 110.

The filters A and B are constructed, for example, to accept signals up to 60 cycles and to have as much rejection as possible at 300 cycles and above on a single half-cycle transient wave. The purpose of the filters is to overcome the problems of shock waves generated by supersonic rockets. For example, when such a rocket flies over one of the geophone transducers to impact the target area its resulting shock wave would otherwise excite the sensor and produce erroneous data. The specific filter design described above is recommended because tests have indicated that the predominant frequencies resulting in the ground from such a shock wave are in the region of 300 cycles, and the initial pressure from impact is in the region of 60 cycles. For water ranges a dual filter is preferable which will attenuate 200 cycle frequencies in the case of rockets, and 300 cycles in the case of bombs.

The threshold detectors "A" and "B" are used to set the amplitude at which a signal is accepted. So as to render the system relatively immune to random noise after the triggering threshold is reached, the blanking circuits "A" and "B" blank all input signals for a period, for example, of 5 seconds after an accepted signal is passed so as to prevent multiple triggering from reflected pressure waves.

After the divider 108 has counted 256 clock pulses, it enables an "and" gate 114 and permits the next clock pulse to pass through that gate as an automatic reset for the system. This pulse is applied to an "or" gate 116, and a manual reset pulse from a reset switch 118 may also be applied to the reset "or" gate. The reset "or" gate 116 is used to reset the flip-flops A, B, 102, as well as the divider 108 and a ($2^{-7}$) delay counter 120. The delay enable gate 110 is connected to the delay counter 120 which, in turn, is connected to the display gate 112.

The output of the display gate is connected to drive appropriate drivers 130, 132 and 134, which respectively constitute a "units", "tens" and "hundreds" drivers for associated Nixie display tubes 140, 142 and 144. It will be appreciated that the X-axis information is displayed on the Nixie tubes as a decimal number. It will also be appreciated that a similar Y-axis decimal number will be displayed on similar Nixie tubes driven by the logic circuitry associated with the C and D transducers.

The reset switch 118 also serves to reset the Nixie read-out to zero during the manual resetting operation. However, in order to obviate operator errors, the system also may include an automatic reset for the Nixie read-out prior to the succeeding ordnance impact in order to prevent two sets of data from being added together should the operator forget to reset the read-out.

At the leading edge of a signal from either transducer "A" or "B", which is applied through inverters 152 and 154 to "and" gates 156 and 158, and which are also applied through an "or" gate 150 to a delay circuit 160 whose output enables the "and" gates 156 and 158, a short duration pulse is provided through the "or" gate 162 at the proper time to reset the Nixie read-out before the data of the corresponding impact is recorded. The manual reset pulse from the switch 118 is also passed through the "or" gate 162.

It will be appreciated from an examination of the circuit of FIG. 5 that the conditioned inputs of both the transducers A and B are fed to the clock generating circuit 104, the frequency of which is set by the calibration control 106. A signal from either transducer A or B starts the clock. One of the clock outputs is fed to the display gate counter 112 which allows clock pulses to be fed to the X-axis counter only after the receipt of the conditioned signal from the transducer A. A second output from the block is fed to the delay gate 110 only after the receipt of a signal from the transducer B. The delay circuit 120 is a divider which generates a pulse to inhibit the X-axis counter by disabling the gate 112 after 128 clock pulses have been received. A third output from the clock is fed to the second divider 108 which after 256 clock pulses have been counted, for example, stops the clock and resets the system in readiness for the next series of scoring signals.

In the above description, it can be seen that if the transducers A and B receive signals at the same time, the counter 120 will count a total of 128 clock pulses showing that the ordnance impacted on a line equidistant from the two transducers. If the ordnance impacted at transducer A the counter would indicate a count of 256, 128 clock pulses for the propagation time of the P-wave between the two transducers plus the 128 clock pulses permitted by the delay. If the ordnance impacts at the transducer B no counts will be received, since the delay count of 128 is subtracted from the propagation count of 128.

More specifically, it will be observed from FIG. 5 that the conditioned A and B signals are passed through the "or" gate 100 to set the clock enable flip-flop 102. As mentioned above, after 256 clock pulses have been counted, the output of the divider 108 enables the "and" gate 114 and allows the 257th clock pulse to pass through the gate as an automatic reset pulse. The automatic reset pulse passes through the reset gate 116 and resets all flip-flops except those associated with the Nixie indicators 140, 142 and 144. The delay enabled gate 110 passes clock pulses to the delay network 120 when enabled by the B flip-flop. The display gate 112 passes clock pulses when enabled by the A flip-flop and by the delay network 120. The delay network 120 disables the display gate 112 when 128 clock pulses have occurred after the B flip-flop was set.

Figure 6:
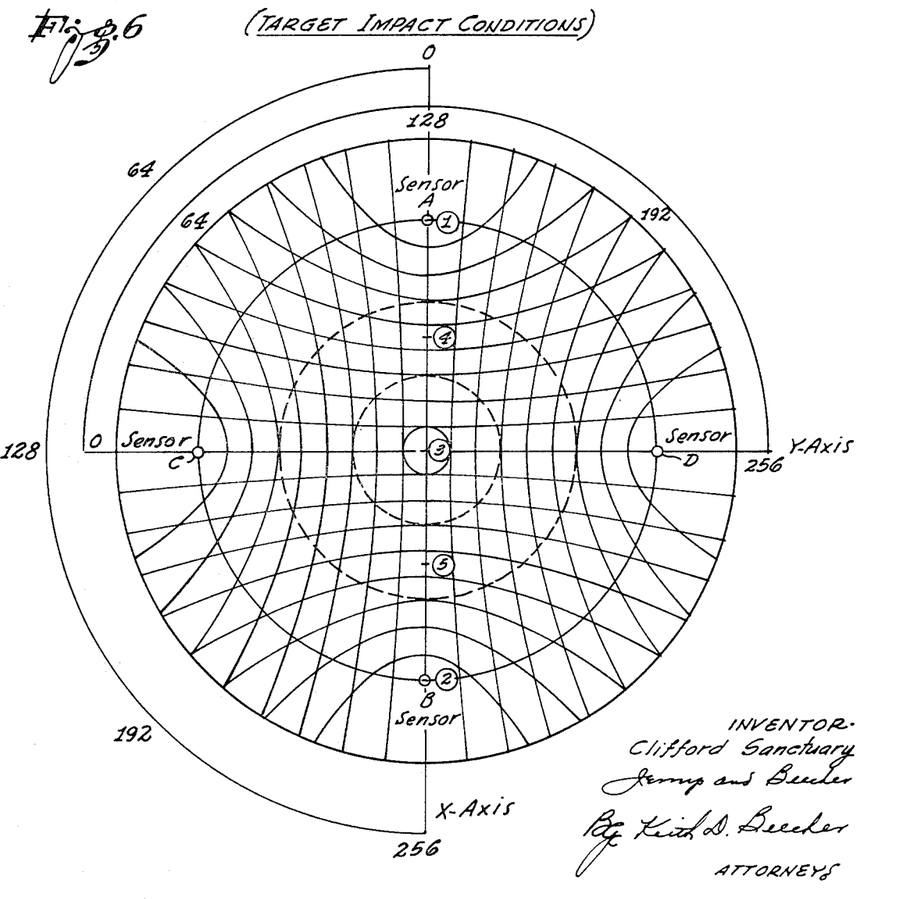
FIG. 6 is a diagram, like FIG. 2, useful in describing the operation of the scoring system of the invention.

Reference is now made to FIG. 6, and to the circled numbers in FIG. 6 which refer to five different points of ordnance impact within the target area. These five points, with reference to the circled numbers 1–5 of FIG. 6 are as follows:

When the ordnance impacts at the position shown by the circled 1 in FIG. 6, it will cause a signal from the transducer A to start the clock 104 and enable the display gate 112, thereby allowing clock pulses to pass through to the indicator counters 130, 132 and 134. Before the seismic signal arrives at transducer B, 128 clock pulses will be counted. The signal from the transducer B will then set the B flip-flop and allow clock pulses to pass through the delay enable gate 110 to the delay network 120. After the delay network 120 accumulates 128 clock pulses, it will disable the display gate 112. The indicators will indicate "128". Since the last 128 clock pulses have also been gated through the display gate, the indicators will indicate 256. The next clock pulse will reset all the flip-flops since the divider 108 has counted the 256 clock pulses.

When the ordnance impacts at the position shown by the circled 2 in FIG. 6, this impact will cause the transducer B to generate a signal which will start the clock 104 and set the B flip-flop. Clock pulses will be passed through the delay enable gate 110 to the delay network 120. At the time the seismic signal arrives at the transducer A, the delay network 120 will have counted 128 pulses and will disable the display gate 112 at the same time the A flip-flop is set. The result is that no clock pulses are passed through the display gate and the indicators will indicate "000". Automatic reset will occur on the 257th clock pulse, as in the preceding case.

When the ordnance impacts at the center of the target, as indicated by the circled 3 in FIG. 6, seismic signals will arrive simultaneously at both the transducers A and B. This will cause the A and B flip-flops to be set at the same time. The clock generator 104 will be turned on and the display gate 112 and delay enable gate 110 will both be opened. After 128 clock pulses the delay network 120 will close the display gate 112 and the indicators 140, 142 and 144 will indicate "128". Automatic reset will occur on the 257th clock pulse as in case 1.

When the ordnance impacts at the point designated by the circled 4 in FIG. 6, a seismic signal will arrive at transducer A before it arrives at transducer B. As soon as the signal arrives at transducer A the clock 104 will be turned on and the display gate 112 will be opened. After 64 clock pulses, the seismic signal will arrive at transducer B. The signal from transducer B will open the delay enable gate 110 and allow clock pulses through to the delay network 120. When the delay network 120 accumulates 128 pulses the display gate 112 will be closed. The indicators will indicate "192". Automatic clearance will occur on the 257th clock pulse as in case 1.

Finally, when the ordnance impacts at the point designated by circled 5 in FIG. 6, a seismic signal will arrive at the transducer B before it arrives at transducer A. The B flip-flop will be set and the delay enable gate 110 will be conditioned, allowing clock pulses to pass through to the delay network 120. After 64 pulses the seismic signal will arrive at transducer A. The signal from transducer A will set the A flip-flop and open the display gate 112. This permits 64 clock pulses to pass through the display gate before it is disabled by the signal from the delay network 120. The indicator will indicate "064". Automatic reset will occur on the 257th clock pulse as in case 1.

The divider 108 is provided in order to take care of cases where the ordnance falls outside the scoring area and the signals are not received by all of the transducers.

Installation of the scoring system on the selected site is relatively simple. The transducer locations are determined and the sensors are buried with their excitation faces directed towards the target center. Special purpose cables are then strung between the sensors and the range control tower 12 and connected to the data conditioning and display unit in the range control tower. When the system has been installed, calibration is required for each particular target area. This control determines the exact clock frequency for the particular system. The frequency control 106 may, for example, be a Digidial mounted on the front panel of the equipment, and calibrated in a range of 000 to 999. These calibrations are proportional to propagation velocity of the seismic wave from "slow" to "fast".

The invention provides, therefore, a simple and reliable system which is relatively inexpensive to construct, and which is easy to maintain. The system also is precise and accurate in its operation, and may be operated with a minimum of personnel.

It will also be appreciated that although a particular embodiment of the invention has been shown and described, modifications may be made. It is intended in the following claims to cover all modifications which come within the spirit and scope of the invention.

What is claimed is:

1. A remote scoring system for a weapons range to determine the impact point of ordnance such as bombs, rockets and the like, within a target area, said scoring system including a first pair of pressure sensor units positioned diametrically opposite one another, and a second pair of pressure sensor units located diametrically opposite one another and angularly displaced from the first pair, both of said pairs being located on the perimeter of the target area to sense pressure waves created by the aforesaid ordnance upon impact and for producing corresponding electrical signals indicative of the time of arrival of such waves; and electrical processing and display circuitry including first and second logic control systems respectively connected to said first and second pairs of said sensor units, and first and second display units respectively connected to said first and second logical control systems, said electrical processing and display circuitry being responsive to said electrical signals for displaying data representative of X-axis and Y-axis coordinates of the location of the point of impact of such ordnance with respect to the target area, each of said first and second logic control systems including clock generating means, counter means coupled to said clock generating means for providing a count for the corresponding display unit, first gate means coupled to one of the sensor units of the corresponding pair for passing clock pulses from said clock generating means to said counter means in response to a signal from said one of said sensor units, and second gate means coupled to the other of the sensor units of said corresponding pair and associated delay means for passing clock pulses from said clock generating means to said counter means in response to a signal from the other sensor unit of the corresponding pair, the latter clock pulses terminating the count of said counter means after a predetermined time delay established by said delay means.

2. The scoring system defined in claim 1, in which said range is located on land, and said pressure transducer means comprise seismic pressure sensors buried in the ground and located a predetermined angular position around the perimeter of the target area.

3. The scoring system defined in claim 1, in which said range is located in a body of water, and said pressure transducer means comprise pressure sensors immersed below the surface of the body of water and located at predetermined angular positions around the perimeter of the target area.

4. The scoring system defined in claim 1, in which said first and second logic control systems each includes a threshold detector to determine the amplitude of the signal to be accepted from the corresponding sensor units.

5. The scoring system defined in claim 4, in which each of said logic control systems includes a blanking circuit coupled to said threshold detector for blanking all input signals for a predetermined time interval after the receipt of an acceptable signal so as to render the system relatively immune to random noise after the triggering threshold of the corresponding threshold detector has been reached.

* * * * *